Oct. 3, 1950     H. C. WENDT     2,524,553
GYROSCOPE POSITIONING APPARATUS
Filed Feb. 28, 1947     3 Sheets-Sheet 1

Inventor:
Harry C. Wendt,
by    *Claude H. Mott*
His Attorney.

Oct. 3, 1950  H. C. WENDT  2,524,553
GYROSCOPE POSITIONING APPARATUS
Filed Feb. 28, 1947  3 Sheets-Sheet 2

Inventor:
Harry C. Wendt,
by *Charles A. Neet*
His Attorney.

Oct. 3, 1950   H. C. WENDT   2,524,553
GYROSCOPE POSITIONING APPARATUS
Filed Feb. 28, 1947   3 Sheets-Sheet 3

Inventor:
Harry C. Wendt
by Clarke A. Watt
His Attorney.

Patented Oct. 3, 1950

2,524,553

UNITED STATES PATENT OFFICE 2,524,553

GYROSCOPE POSITIONING APPARATUS

Harry C. Wendt, Lynnfield, Mass., assignor to General Electric Company, a corporation of New York Application February 28, 1947, Serial No. 731,689

14 Claims. (Cl. 74—5.1)

This invention relates to gyroscopes and more particularly to a method and apparatus for positioning or resetting a spinning gyroscope mounted in a gimbal for 3 degrees of freedom.

Gyroscopes of the stable azimuth and stable vertical types are widely used in aircraft instruments for indicating azimuth heading and pitch and bank attitudes of the aircraft. These gyroscopes are usually called the directional gyro and the horizon or attitude gyro. In such instruments it is customary to provide mechanical caging apparatus for centralizing or positioning the gyro gimbal relative to the instrument casing and the gyro bearing frame relating to the gimbal. The caging apparatus is used to position the gyroscope to a reference position and thereby restore the indicators to a proper indicating position in a case where the gyroscope becomes upset because of violent maneuvering of the aircraft, power failure, or for some other reason. The caging mechanism now used on such instruments is intricate and expensive, usually involving a complicated gear train, a rotating arm, levers, springs, etc. In the interest of reliability and cost reduction there has been for some time a need for simplification of the caging mechanism. Furthermore, with the advent of hermetically sealed instruments and remotely located gyroscopes, the need for a simplified and quick acting caging apparatus, preferably electrically controlled, has become acute.

An object of the present invention is to provide an improved method and apparatus for positioning a gyroscope.

A further object is to provide gyroscope positioning apparatus which is simple, quick-acting, and which can be electrically controlled.

Another object is to provide positioning apparatus which will reset the gyroscope to any desired position.

Further objects and advantages of the invention will become apparent and the invention will be better understood from the following description, referring to the accompanying drawings, and the features of novelty which characterize the invention will be pointed out with particularity in the claims annexed to and forming a part of this specification.

Figure 3:
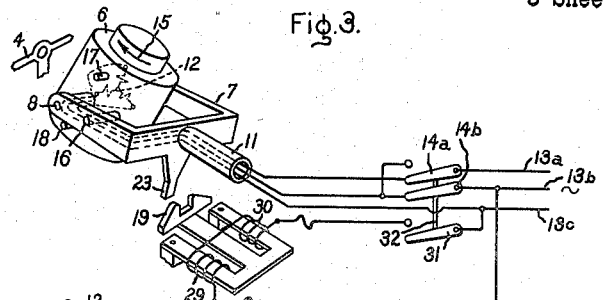
Fig. 3 is a simplified, schematic representation of the gyroscope, its supporting gimbal and the positioning mechanism combined with an electrical wiring diagram of the positioning control system.
Figure 4:
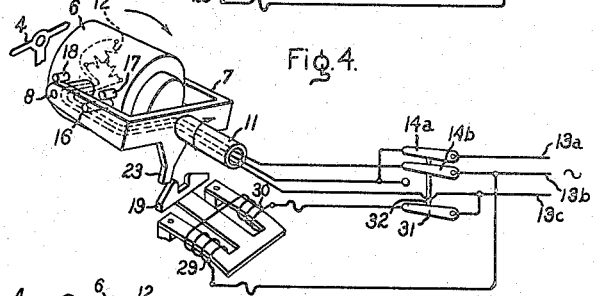
Figure 5:
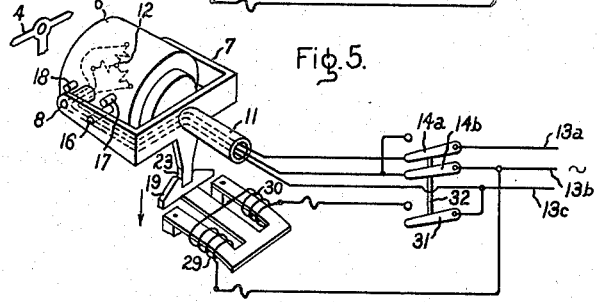

Figs. 4 to 7, inclusive, are similar to Fig. 3 except that the gyroscope and positioning apparatus are shown in different stages of operation for the purpose of facilitating an understanding of the operation of the invention.

Figure 8:
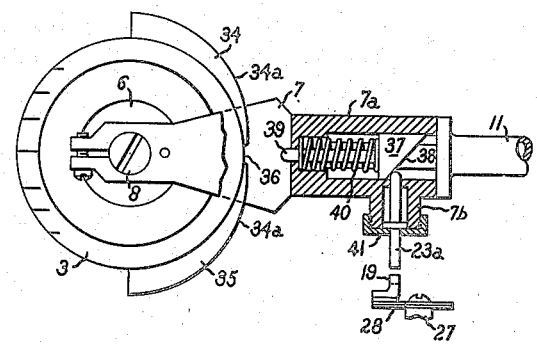

Fig. 8 shows a modified form of the invention in which a different arrangement is utilized to position the gyroscope bearing frame relative to its supporting gimbal.

Figure 9:
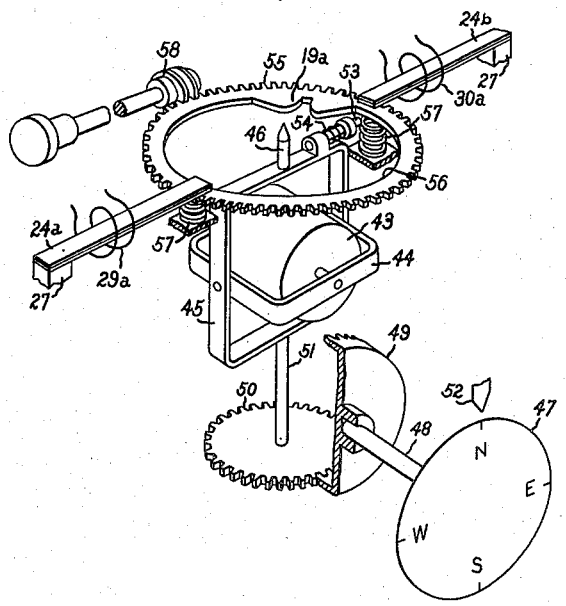

Fig. 9 shows an application of the invention to a directional gyro type of instrument wherein an adjustment of the reset position is provided.

Figure 1:
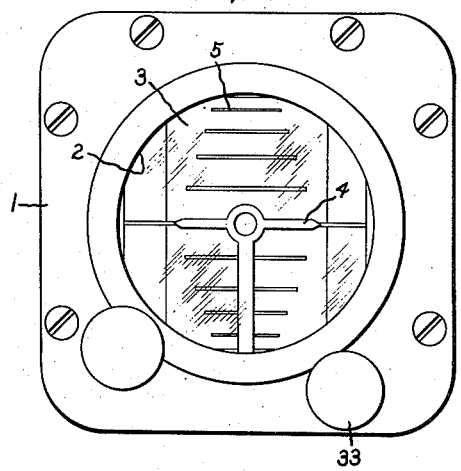
Fig. 1 is a front elevation view of attitude gyro type of aircraft instrument to which the positioning apparatus of the present invention may, for example, be applied.
Figure 2:
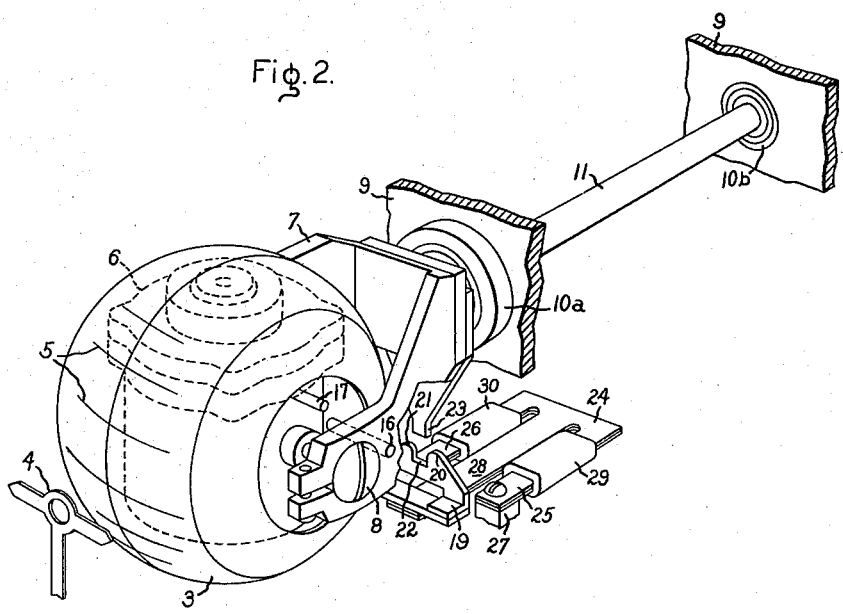
Fig. 2 is a perspective internal view of the instrument shown in Fig. 1 illustrating certain constructional details.

Referring to the drawing, I have illustrated an application of my improved gyroscope positioning apparatus to a gyroscopically-actuated aircraft instrument utilized to indicate pitch and bank attitudes of the aircraft in flight, such instrument being known in the art as an attitude gyro. Referring particularly to Figs. 1 and 2 of the drawing, the instrument is shown as comprising a face plate 1 which is adapted to be mounted on the instrument panel of an aircraft to permit observation by a pilot or other observer of aircraft pitch and bank indications as seen through an opening or window 2. Pitch and bank attitudes of the aircraft are indicated by relative movement of a gyro-stablized indicator 3 and a reference index in the form of a miniature airplane 4. The indicator 3 may be provided with graduated indicia 5 which, when read in connection with the relative position of the miniature airplane 4, gives a visual indication of the pitch and bank attitudes of the aircraft on which the instrument is mounted.

As best illustrated in Fig. 2, the indicator 3 is in the form of a hollow shell, the center, indicia-bearing surface of which is approximately spherical. For the purpose of stabilizing the indicator there is provided a conventional gyroscope of the vertical spin axis type, the rotor of which is housed within a bearing frame 6. The bearing frame 6 is rotatably mounted on a yoke-shaped gimbal member 7 by means of trunnions, one of which is indicated at 8. The trunnions permit the bearing frame to rotate about a transverse horizontal axis perpendicular to the spin axis of the gyroscope, which axis will be referred to as the minor gimbal axis. The gimbal member 7 is mounted on fixed supports 9 by means of bearings 10a and 10b which rotatably support a hollow gimbal shaft 11. The axis of rotation of the gimbal shaft 11 is perpendicular to the minor gimbal axis and will be referred to as the major gimbal axis.

In attitude indicating instruments of the type illustrated, the major gimbal axis extends in the direction of the longitudinal or roll axis of the aircraft and the minor gimbal axis extends in the direction of the athwartship or pitch axis of the aircraft when the aircraft is in a level position. The gimbal mounting arrangement described permits 3 degrees of freedom of gyroscope movement, and with this arrangement the gyroscope tends to maintain the orientation of its spin axis in space as the aircraft rotates about its roll and pitch axes. The indicator 3 is mounted on and stabilized by the gyro bearing frame 6 so that roll and pitch movements of the aircraft are indicated by corresponding relative movements between the indicator 3 and the fixed miniature airplane 4. Usually instruments of this type are provided with a pendulum erecting device for slowly precessing the gyroscope to maintain its spin axis in the approximately vertical position. For the purpose of clarity, a showing of the erecting device has been omitted since it may be of conventional construction and forms no part of the present invention.

The gyro erecting device will operate slowly to erect the gyroscope and its supporting gimbal to the centered reference position indicated in Fig. 2 of the drawing. This erecting action is, however, necessarily slow in order to prevent oscillations of the erecting pendulum from affecting the gyroscope indication. Conditions therefore arise, as during a starting up of the instrument or as a result of tumbling of the gyroscope due to violent maneuvering of the aircraft, when it is desirable to be able quickly to erect the gyroscope and its gimbal to the reference position. For this purpose, it is customary to provide apparatus for positioning the gyroscope to its reference position. According to the present invention, quick-acting and simplified apparatus is provided for accomplishing this positioning of the gyroscope, which will now be described.

My invention makes use of the fact that if a reverse or decelerating torque is applied to a universally-mounted spinning gyroscope, the gyroscope upsets and causes the supporting gimbal to spin. I provide apparatus which functions to upset the gyroscope and spin the gimbal and at the same time to render active a latching mechanism which locks the gimbal when it swings to a predetermined reference position. The latching mechanism is then released and an acclerating or forward torque is applied to the gyroscope. The accelerating torque causes the gyroscope to precess to a position in which the bearing frame is centered with respect to the supporting gimbal, the gimbal having been previously properly positioned by the operation of the latching mechanism. The operation of this apparatus will now be described in detail.

In the gyroscope illustrated, the motive power for driving the gyroscope rotor is provided by a three phase electric motor, the three phase windings of which are schematically indicated at 12 (Fig. 3). Polyphase gyroscope motors of this type are well known and may be, for example, either of the hysteresis or induction type. When polyphase electric motors are used to drive the gyroscope, the reverse or decelerating torque required to cause an upsetting of the gyroscope in accordance with the present invention, may be obtained conveniently by simply providing suitable switching apparatus for reversing two of the phase connections to the motor.

Referring now to Fig. 3 of the drawing, the gyroscope motor windings 12 are supplied with current from a suitable source of three phase alternating current power connected to the supply leads 13a, 13b and 13c. Interposed between the motor windings 12 and the supply leads 13a and 13b are two phase-reversing switches 14a and 14b. The switches 14a and 14b are connected as shown in the drawing so that when they occupy the lower position indicated in Fig. 3 the power leads 13a and 13b are connected to the motor windings 12 to cause rotation of the gyroscope rotor in the normal or forward direction, indicated by the arrow 15. When the switches 14a and 14b are moved to the upper position shown in Fig. 4, the connections between the power supply leads 13a and 13b and the motor windings 12 are reversed which results in the application of a reverse or decelerating torque to the gyroscope rotor.

When the switches 14a and 14b are placed in the lower position of Fig. 3, the gyroscope motor brings the rotor up to speed in the normal or forward direction. If the switches 14a and 14b are then thrown to the upper position shown in Fig. 4, a decelerating or reverse torque is applied to the rotor which causes the gyroscope to upset. The reason for this is the fact that whenever there is a tilt of the spin axis away from the perpendicular to the minor axis (normal position), however small, a component of the decelerating torque exists about the major gimbal axis which tends to rotate the gimbal. This results in a precession of the gyroscope such that the bearing frame rotates about the minor gimbal axis and tends to seek an equilibrium position 90 degrees in the direction of tilt from the normal position shown in Fig. 2. Stops are preferably provided which limit this precessional movement of the gyroscope when the bearing frame 6 reaches the positions shown in Figs. 4 and 7, which are a few degrees short of the so-called gimbal lock position, i. e., the position in which the gyro spin axis becomes aligned with the major gimbal axis. These stops are shown as comprising a pin 16 mounted on the gimbal member 7 and a pair of cooperating pins 17 and 18 mounted on the bearing frame 6. When the bearing frame 6 rotates clockwise to the position shown in Fig. 4, the pins 16 and 17 engage preventing further clockwise rotation of the bearing frame in the gimbal. When the bearing frame rotates counterclockwise to the position shown in Fig. 7, pins 16 and 18 engage preventing further counterclockwise rotation of the bearing frame in the gimbal. Preferably the stop pins are so arranged that engagement occurs a few degrees short of the gimbal lock position, the total rotating travel of the bearing frame being then limited to something less than 180 degrees. When the stop pins engage as the result of an upsetting of the gyroscope, the gyroscope loses its stability and the gimbal 7 spins about the major axis due to the fact that there is a large component of decelerating or reverse torque about the major gimbal axis. A previously positioned latching mechanism then operates to latch the gimbal when it swings to a predetermined reference position. This latching mechanism will now be described.

As best shown in Fig. 2 of the drawing, the latching mechanism comprises a notched cam member 19 having two upwardly inclined cam surfaces 20 and 21 located on opposite sides of a center notch 22. The notched cam 19 is arranged to cooperate with a pin or dog 23 attached to and depending from the gimbal 7. When the cam is in the lower inactive position shown in Fig. 2, it does not engage the pin 23 so that the gimbal 7 is free to rotate in unrestricted manner about the major gimbal axis. However, when the cam is raised to the position shown in Fig. 5, the cam surfaces 20 and 21 lie within the path of swing of the gimbal pin 23. When the gimbal swings or rotates about the major axis with the cam in the raised position, the pin 23 rides up over either cam surface 20 or 21, depending upon the direction of rotation, and is then locked in the notch 22. In order to permit this locking action to take place when the cam is in the upper position, it is necessary to provide a resilient mount for the cam which is inherently provided, in the illustrated arrangement, as a part of a thermal, cam-operating motor, which will now be described.

For the purpose of moving the cam 19 between upper and lower positions, there is provided a thermal motor comprising a bimetal strip 24 which warps under the action of locally applied heat. The bimetal strip 24 is E-shaped and is formed of two laminated metal plates having different thermal coefficients of expansion, the plates being fastened together in any suitable manner as by welding. The ends of outer legs 25 and 26 are secured to a stationary support 27 while the outer end of center leg 28 is secured to and carries the notched cam 19. This mounting arrangement provides sufficient resilience so that the cam 19 can be sprung downwardly when it is in the upper, active position, to permit the pin 23 to ride over the cam surfaces 20 and 21. The orientation of the bimetal strip 24 is selected during assembly so that when local heat is applied to the legs 25 and 26 the strip warps downwardly causing the cam 19 to be raised to the active position shown in Fig. 4.

In order to provide electro-responsive control means for raising and lowering the cam 19, two coils of resistance wire 29 and 30 are wound about legs 25 and 26 as shown. As illustrated in Fig. 3, the resistance coils 29 and 30 are connected in series, one terminal being connected directly to the power supply lead 13b and the other terminal being connected to the power supply lead 13c through a switch 31. When the switch 31 is open the resistance coils 29 and 30 are deenergized and the bimetal strip 24 is in the position shown in Fig. 2 where the cam 19 is in the lower, inactive position. When the switch 31 is closed, the resistance coils 29 and 30 are energized and produce local heat around legs 25 and 26 causing the strip to warp downwardly raising the cam to the upper active position where it is operative to latch the gimbal 7 when it swings to the notching position. The use of the E-shaped bimetal strip is preferred because it inherently provides compensation for ambient temperature changes. Thus when all of the legs 25, 26 and 28 are warped an equal amount due to ambient temperature changes, the cam 19 tends to remain in the same position, and therefore the latching action is not affected by the ambient temperature changes.

The motor torque reversing switches 14a and 14b and the latching cam control switch 31 are coupled together by a common operator 32. Thus when the switches are in the lower position shown in Fig. 3, the motor torque is in the normal forward direction and the latching cam 19 is in the lower inactive position. When the switches are actuated to the upper position shown in Fig. 4, reverse torque is applied by the gyroscope motor and the cam 19 is raised to the upper active position. In the application illustrated the switch operator 32 is coupled by a mechanical connection (not shown) so that operation of the switch is permitted from the front face of the instrument by actuation of a suitable control knob 33.

The operation of the gyroscope positioning apparatus is as follows:

During normal operation of the instrument the switches 14a, 14b and 31 are positioned in the lower position of Fig. 3 so that the gyroscope motor drives the rotor in a normal forward direction and the cam 19 is in the lower inactive position permitting complete freedom of the gimbal member 7. It will now be assumed that for some reason the gyroscope becomes displaced from its normal reference position shown in Fig. 2. Such displacement is indicated in Fig. 3 by a clockwise displacement of the bearing frame 6 and a clockwise displacement of the gimbal 7 from the reference position. In order to reposition the gyroscope to the reference position, the control switches 14a, 14b and 31 are first moved to the upper position shown in Fig. 4. This causes the gyroscope motor to apply a reverse or decelerating torque to the gyroscope rotor and as a result the gyroscope precesses causing the clockwise rotation of the bearing frame 6 about the minor gimbal axis. At the same time closure of the switch 31 causes the bimetallic strip 24 to warp downwardly, positioning the cam 19 to the upper active position. When the bearing frame 6 reaches the position shown in Fig. 4, stop pins 16 and 17 engage whereupon the gyroscope loses its stability. Since there is a large component of deceleration torque about the major gimbal axis, the gimbal 7 spins in a clockwise direction until the pin 23 rides up cam surface 21 and is received in latching relation in the notch 22. The initial placement of the cam 19 is such that the locking action occurs when the gimbal 7 has rotated to the desired reference position. Such reference position may, for example, be that shown in Fig. 2 wherein the minor gimbal axis is parallel to the athwartship axis of the aircraft when the aircraft is level. The operator will be informed of the fact that the latching has taken place by rotation of the indicator 3 to the vertical position as observed through the instrument opening 2. At this point the observed pitch indication will be approximately 90 degrees in error due to the fact that the bearing frame 6 has precessed approximately 90 degrees from its normal position. The control switches 14a, 14b and 31 are then restored to the lower position shown in Fig. 5 whereupon the gyroscope motor applies a normal or forward torque to the gyroscope rotor. Since the gyroscope rotor speed has been reduced by the previous decelerating action, the restoration of the normal motor torque in a forward direction causes the gyroscope rotor to accelerate. At the same time the opening of the switch 31 causes the bimetallic strip 24 to return to its initial unwarped position, thereby lowering the cam 19 to the lower inactive position and freeing the gimbal member 7. The application of the accelerating torque to the gyroscope rotor then results in a precessing action in which the bearing frame 6 rotates counterclockwise about the minor gimbal axis until it reaches the reference position in which the gyroscope spin axis is approximately vertical.

The operator will be informed of this final step in the positioning action by return of the indicator 3 to the center or zero pitch indication illustrated in Fig. 1.

Thus, it will be seen that in order to reposition the gyroscope it is only necessary for the operator to actuate the control knob 33 to a caging position and wait until the indicator 3 is observed to move to the vertical position. The operator then simply repositions the control knob 33 to the original or uncage position whereupon the positioning action is completed by automatic rotation of the indicator 3 to the zero pitch indicating position. Actual tests have shown that this entire operation may be performed at a time interval of the order of one to two minutes with conventional motors and less than one minute with motors having special acceleration characteristics.

Figure 6:
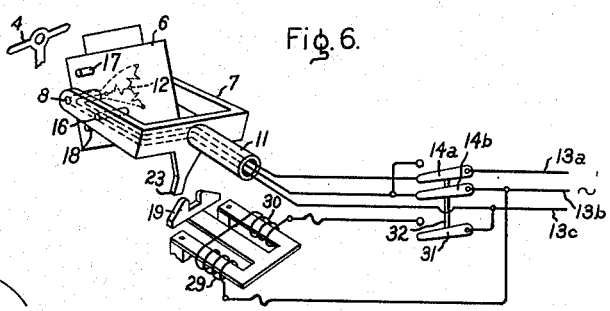
Figure 7:
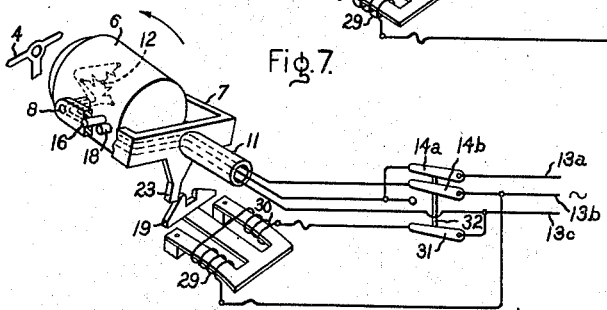

Under certain conditions the sequence of events immediately prior to the latching of the gimbal 7 may be somewhat more complicated than those described above. For example, the gyro bearing frame 6 may become displaced counterclockwise from the center position, and the gimbal 7 may become displaced a small amount in a clockwise direction as shown in Fig. 6. In such a case the deceleration torque applied to the gyroscope rotor will cause the bearing frame 6 to pivot about the minor axis in a counterclockwise direction until the pins 16 and 18 engage as shown in Fig. 7. The reason for this reverse movement is the fact that for the direction of rotor rotation assumed, as indicated by arrow 15, the component of the decelerating torque about the major gimbal axis is now in the reverse direction from that previously described. When the pins 16 and 18 engage as shown in Fig. 7, the gyroscope loses its stability and the component of the decelerating torque about the major gimbal axis causes the gimbal 7 to rotate counterclockwise about the major gimbal axis. If the pin 23 is initially displaced far enough from the cam 19 the gimbal will obtain enough momentum to cause the pin 23 to ride up over the cam surface 20 and lock in the notch 22. However, in the case assumed there may not be sufficient momentum to cause a sufficient displacement of the cam to permit the locking action to take place. In such a case the energy stored in the resilient cam by a partial depressing thereof is restored to the gimbal and causes an initially small clockwise rotation thereof. This causes a precession of the gyroscope such that the bearing frame 6 quickly rotates about the minor gimbal axis to the position of Fig. 4 where the pins 16 and 18 engage. The component of the deceleration torque about the major gimbal axis is then reversed so that the gimbal spins clockwise about the major gimbal axis until the pin 23 rides over the cam surface 21 and locks in the notch 22. Under such a condition there is almost 360 degrees rotation of the gimbal so that there is adequate momentum to depress the cam member 19 to permit the locking action to take place.

In the positioning apparatus previously described, precession of the gyroscope resulting from an application of accelerating torque thereto was relied upon for the final positioning of the gyroscope bearing frame about the minor gimbal axis. In Fig. 8 of the drawing, there is shown a modification wherein the final positioning of the bearing frame about the minor gimbal axis is accomplished by external application of an erecting force directly to the bearing frame to position it. In order to accomplish this, there are attached to the bearing frame 6, on the rearward side of the indicator shell 3, two rearwardly extending cam members 34 and 35. The cam members 34 and 35 are spaced apart to form a notch 36 and are provided respectively with cam surfaces 34a and 35a which slope inwardly and downwardly toward the notch. In this modification the gimbal member 7 has a hollow shank portion 7a which houses a slidable cam 37 having a cam surface 38. Movable with and attached to the cam 37 is a pin 39, the cam and pin being normally biased to the retracted position shown by means of a suitable compression spring 40. The gimbal shank 7a has a depending projection 7b in which is slidably mounted a vertically movable pin 23a. The upper end of pin 23a operatively engages the cam surface 38 of the cam 37, while the lower end is adapted to cooperate with the notched cam 19. Otherwise the parts in the modification of Fig. 8 are identical with those previously described.

The operation of the modified arrangement is as follows:

After the control switches have been actuated to the cage position, the gyro gimbal spins and the notched cam 19 is raised as previously described. When the pin 23a is latched in the notch 22 of the cam 19, the resilient leg 28 exerts a biasing force which moves the pin 23a in an upward direction. The pin thereupon moves the cam 37 and the pin 39 to the left so that the outer end of the pin 39 engages either cam surface 34a or cam surface 35a, depending upon which direction the bearing frame 6 has been rotated from the reference position shown in Fig. 2. Engagement of the pin 39 with either of the cam surfaces 34a or 35a causes a torque to be applied to the bearing frame 6 which rotates it to the reference position in which the end of the pin 39 falls into the notch 36. The gimbal 7 is then mechanically positioned relative to the instrument casing and the bearing frame 6 is mechanically positioned relative to the gimbal 7. When the gyro positioning control switches are returned to the uncage position the cam 19 is lowered until it moves free of the lower end of the pin 23a. At the same time the pin 23a moves downwardly until its movement is arrested by a stop 41. This action permits the compression spring 40 to retract the pin 39 and the cam 37 thereby freeing the bearing frame 6 for rotation about the minor gimbal axis. The gyro is then once more free for rotation about both gimbal axes and functions in a normal manner. It will be clear that by a proper meeting of the cams 34 and 35 the bearing frame 6 may be positioned to any desired location relative to the gimbal 7. In some cases gyro verticals normally operate with the gyro spin axis inclined a small amount relative to the vertical. This arrangement permits the bearing frame to be quickly oriented during caging to the normal tipped position of the gyro spin axis.

In Fig. 9 of the drawing there is shown an application of my improved gyroscope positioning apparatus to a directional gyroscope, such instrument being commonly used on moving vehicles such as aircraft for indicating azimuth heading. The directional gyroscope is illustrated diagrammatically as comprising the rotor 43 mounted for rotation in a bearing frame 44, the spin axis of the rotor being normally horizontal. The rotor 43 is powered by a reversible-torque motor (not shown) which may be the same as that described in connection with the previously described attitude gyro. The bearing frame 44 is rotatably mounted in a vertical gimbal 45 for rotation about a horizontal minor gimbal axis which is perpendicular to the rotor spin axis. The gimbal 45 is mounted for rotation about a vertical or major gimbal axis by suitable trunnions, the upper trunnion being indicated at 46. The directional gyro has a rotatable compass card 47 mounted on a shaft 48 which is journaled in fixed supports and geared to rotate with and at the same speed as the main gimbal 45 by means of a gear 49 mounted on shaft 48 and a cooperating gear 50 mounted on a shaft extension 51 of the main gimbal. As will be well understood by those skilled in the art, rotation about a vertical axis of the vehicle on which a directional gyro is mounted causes corresponding rotation of the compass card 47 relative to a stationary pointer 52, thereby giving an indication of the azimuth heading of the vehicle. It is well known that directional gyros have a tendency to drift or wander due to gimbal friction and also due to rotation of the earth so that it is customary to reset the instrument periodically to bring the readings of the compass card into correspondence with the readings of another directional reference such as a magnetic compass. This is usually accomplished by a caging device which locks the gyro bearing frame and then rotates the main gimbal until the compass card indicates the proper heading. My improved gyroscope positioning apparatus may be used advantageously to accomplish this resetting of the directional gyro.

To illustrate one way in which this resetting can be accomplished there is mounted on the main gimbal 45 a horizontally slidable pin 53 which is biased to an extended position by means of a suitable compression spring 54, there being provided suitable stop means (not shown) to limit the outward movement of the pin.

Rotatably mounted on bearing means (not shown) for rotation about an axis concentric with the vertical gimbal axis is an annular ring gear 55, the inner surface 56 of which has a radius slightly larger than the radius of the pin 53 in its extended position. The ring gear is provided with inwardly extending projections forming a notched cam 19a, similar in shape to the notched cam 19 previously described. Normally, compression springs 57 bias the ring gear 55 to the position shown wherein the plane of the gear lies above the plane determined by the sweep path of the pin 53 so that normally the gimbal 45 is free to swing about the vertical gimbal axis.

For the purpose of moving the ring gear 55 downwardly into the sweep plane of the pin 53 there is provided bimetallic strips 24a and 24b, one end of each strip being mounted on a fixed support 27 with the free ends extending over the gear 55. Wound around the bimetallic strips are heater coils 29a and 30a which, when energized, heat the strips and cause them to warp downwardly and push the gear 55 to the lower active position. In this arrangement, it will be understood that the reversible-torque motor will be controlled by switches such as 14a and 14b and the heater coils 29a and 30a will be controlled by a switch, such as the switch 31. By means of a manually operated worm gear 58 meshing with the gear 55, the position of the cam 19a may be adjusted to determine the caged position of the gimbal 45 about the vertical gimbal axis. The operation of this arrangement is as follows:

When it is desired to cage and set the directional gyro, the cage control switches 14a, 14b and 31 are moved to the cage position. This action applies a reverse torque to the gyro motor and at the same time the bimetal strips 24a and 24b are heated so that the free ends are warped downwardly and position the gear 55 in the sweep plane of the pin 53. Due to the application of the deceleration torque, the gyro bearing frame rotates to the gimbal lock position, there being no stops provided in this modification. When the gimbal lock position is reached, the gyroscope loses its stability and the deceleration torque causes the gimbal to spin about the vertical axis. The spinning of the gimbal is permitted until the pin 53 rides into the notched portion of the cam 19a whereupon the gimbal is locked. The locking position of the gimbal 45 is determined by the previous adjustment of the gear 55 by the manually operated worm 58 and this may be so selected that the rotation of the gimbal and the corresponding rotation of the compass card 47 is such as to bring the compass card to some desired heading. The positioning control switches are then returned to the uncage position restoring normal or forward torque to the gyro motor and deenergizing the bimetal strip heaters, permitting the springs 57 to restore the gear 55 to the upper or inactive position unlatching gimbal 45. The accelerating torque then acts to level the bearing frame 44.

From the foregoing it will be apparent that I have provided simple and inexpensive apparatus for positioning universally mounted gyroscopes about both major and minor gimbal axes. The apparatus can be easily controlled by electrical means so that it is especially well suited for positioning hermetically sealed and remotely located gyroscopes. It should be understood that the invention is not limited to the illustrated arrangements wherein the gimbal latch is positioned by a thermal motor, as obviously other equivalent mechanical and electrical latch-positioning means may be used.

Normally, gimbal stops, such as are provided by the pins 16, 17 and 18, are preferred but they are not necessary as the gyroscope gimbal will spin upon application of reverse motor torque without such stops when the gimbal lock position is reached. However, the stop arrangement has the advantage that by limiting the possible rotation of the gyro bearing frame to approximately 180 degrees, it is unnecessary to use slip rings to conduct electrical power to the gyroscope in cases where electric drive motors are used. In this patent I do not claim broadly the use of a gimbal stop to prevent gimbal lock in a universally operating gyroscopic instrument as this is the subject matter of a prior invention of Allen T. Sinks, which is disclosed and broadly claimed in a pending application, Serial No. 594,628, filed: May 19, 1945, for: "Gyroscope," assigned to the same assignee as the present invention. The invention of this patent includes a novel application of the gimbal stop principle to the achievement of proper setting of gyroscopic instruments.

It should be further understood that the invention is not limited to cases where the electric gyroscope motors are used but can be used in any gyroscope where the drive motor, which may be hydraulic or pneumatic, is provided with a switching arrangement for reversing the direction of the motor torque.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. In combination a gyroscope mounted on supporting means including a rotatable gimbal for 3 degrees of freedom, means for causing said gyroscope to upset resulting in a rotation of said gimbal and means for simultaneously initiating action of a locking device to lock said gimbal after it rotates to a predetermined position.

2. In combination a gyroscope mounted on supporting means including a rotatable gimbal member for 3 degrees of freedom, reversible-torque motor means for driving said gyroscope, a switching device arranged to reverse the torque direction of said motor means to cause an upsetting of said gyroscope and a rotation of said gimbal and a latch member controlled by said switching device to latch said gimbal when it rotates to a predetermined position.

3. In combination a gyroscope mounted on supporting means including a rotatable gimbal member for 3 degrees of freedom, motor means for driving said gyroscope, switching means arranged when operated to reverse the torque direction of said motor means to cause the gyroscope to upset and the gimbal to spin, a normally retracted latch member arranged to be extended to a position where it latches said gimbal when it swings to a predetermined center position and means responsive to operation of said switching means for extending said latch member.

4. In combination a gyroscope mounted on supporting means including a rotatable gimbal member for 3 degrees of freedom, reversible-torque motor means for driving said gyroscope, switching means arranged when operated to reverse the torque direction of said motor means to cause the gyroscope to upset and the gimbal to spin, and caging means operated by said switching means for locking said gimbal after it has swung to a predetermined position.

5. A caging system for a gyroscope mounted on supporting means including a rotatable gimbal for 3 degrees of freedom and having a drive motor the torque direction of which can be reversed, said system comprising a switch connected to control the torque direction of said motor and having first and second positions in which forward and reverse torques respectively are applied to said gyroscope by said motor, a locking device for locking said gimbal when it rotates to a predetermined position in response to application of reverse torque to said gyroscope by said motor, and means for rendering said locking device inactive when said switch is in said first position and for rendering said locking device active when said switch is in said second position.

6. In combination a gyroscope mounted on mounting means including a rotatable gimbal for 3 degrees of freedom, a polyphase electric motor for driving said gyroscope, a switching device arranged to reverse the phase connections to said motor for reversing the torque direction thereof to cause upsetting of said gyroscope and rotation of said gimbal, a normally retracted latching device arranged, when extended, to lock said gimbal as it swings to a predetermined position, and means responsive to operation of said switching means for extending said latch to its gimbal-latching position.

7. In combination a gyroscope mounted on supporting means including a rotatable gimbal for 3 degrees of freedom, a polyphase electric motor for driving said gyroscope, a switching device arranged to reverse the phase connections to said motor for reversing the torque direction thereof to cause upsetting of said gyroscope and rotation of said gimbal, a normally retracted electroresponsive latching device arranged, when energized, to lock said gimbal when it swings to a predetermined position, and means responsive to operation of said switching device for energizing said latching device to cause movement thereof to its gimbal locking position.

8. In combination a gyroscope comprising a rotor mounted in a bearing frame for rotation about a spin axis, a gimbal member, said bearing frame being rotatably mounted on said gimbal member for rotation about a minor axis perpendicular to said spin axis and said gimbal being mounted for rotation about a major axis perpendicular to said minor axis, stop means arranged to limit total rotation of said bearing frame about the minor axis to less than 180 degrees and to prevent said bearing frame from rotating to a position in which the gyroscope spin axis would become aligned with the major gimbal axis, reversible-torque motor means for driving said gyroscope, a switching device connected to reverse the torque direction of said motor means to cause precession of said gyroscope and engagement of said stop means whereupon said gimbal spins about said major axis, and a latch member operably positioned in response to actuation of said switching device to lock said gimbal when it swings to a predetermined position.

9. In combination a gyroscope mounted on supporting means including a rotatable gimbal for 3 degrees of freedom, a reversible-torque motor for driving said gyroscope, a switching device for reversing the torque direction of said motor to cause upsetting of said gyroscope and rotation of said gimbal, a pin movable with said gimbal, a resilient notched cam arranged to be moved to a position in which it receives and locks said pin and gimbal when said gimbal rotates to a predetermined position in response to operation of said switching device, said cam being normally in a retracted, inactive position, and means controlled by said switching device for moving said cam to its gimbal locking position.

10. In combination a gyroscope mounted on supporting means including a rotatable gimbal for 3 degrees of freedom, a reversible-torque motor for driving said gyroscope, switching means for reversing the torque direction of said motor to cause upsetting of said gyroscope and rotation of said gimbal, a pin mounted to rotate with said gimbal, a notched cam movable into a plane of rotation of said pin and adapted to receive said pin and lock said gimbal upon rotation thereof in response to operation of said switching means, and means for shifting the position of said notched cam prior to engagement with said pin to predetermine the rotary position of said gimbal at which the gimbal-locking action takes place.

11. In combination a gyroscope comprising a bearing frame mounted on a gimbal for rotation about a minor axis, said gimbal being mounted for rotation about a major axis, a reversible-torque motor for driving said gyroscope, switching means for reversing the torque direction of said motor to cause rotation of said bearing frame about said minor axis and rotation of said gimbal about said major axis, an axially slidable pin arranged to rotate with said gimbal, a resilient notched cam adapted to receive said pin and lock said gimbal when said gimbal rotates about said major axis to a predetermined position, said resilient cam acting also to axially move said pin, and means responsive to axial movement of said pin for rotating said bearing frame about said minor axis to a predetermined position whereby said gimbal and bearing frame are rotated to predetermined positions about said major and minor axes respectively in response to actuation of said switching means.

12. In combination a gyroscope comprising a rotor mounted in a bearing frame for rotation about a spin axis, a gimbal member, said bearing frame being rotatably mounted in said gimbal member for rotation about a minor axis perpendicular to said spin axis and said gimbal member being mounted for rotation on a support about a major axis perpendicular to said minor axis, motor means for applying torque to said rotor, means for controlling the torque direction of said motor means, a normally inactive latch member movable to a position to latch said gimbal member when it rotates about said major axis to a predetermined centered position, a caging control device movable to cage and uncage positions for controlling the torque direction of said motor means and the position of said latch, said caging control device acting when moved to cage position to reverse the torque direction of said motor means to cause an upsetting of said gyroscope and a spinning of said gimbal about said major axis, said caging device further acting in the cage position to cause movement of said latch member to the active position whereby said gimbal member is latched when it swings to said predetermined center position, and said caging control device acting when moved to the uncage position to restore the torque direction of said motor means to a forward direction and to release said latch whereby said gyroscope erects about said minor axis to a position in which the spin axis thereof is perpendicular to said major axis.

13. The method of positioning a spinning gyroscope mounted on supporting means including a rotatable gimbal for 3 degrees of freedom which comprises applying a decelerating torque to the gyroscope rotor to cause an upsetting of the gyroscope and a spinning of the gimbal, locking the gimbal when it swings to a predetermined position, applying an accelerating torque to the gyroscope rotor and then unlocking the gimbal to permit the gyroscope to erect due to precession caused by the accelerating torque.

14. The method of positioning a spinning gyroscope having supporting means including a bearing frame mounted on a gimbal to provide 3 degrees of gyroscope freedom which comprises applying a decelerating torque to the gyroscope rotor to cause a rotation of the bearing frame and gimbal, locking the gimbal when it swings to a predetermined position, positioning the bearing frame while the gimbal is locked, removing the decelerating torque and then unlocking the gimbal.

HARRY C. WENDT.

REFERENCES CITED

The following references are of record in the file of this patent:

UNITED STATES PATENTS

| Number | Name | Date |
| --- | --- | --- |
| 2,200,976 | Bates | May 14, 1940 |
| 2,273,309 | Zand | Feb. 17, 1942 |
| 2,283,720 | Brandt | May 19, 1942 |
| 2,441,307 | Alkan | May 11, 1948 |
| 2,459,496 | Cahill et al. | Jan. 18, 1949 |

FOREIGN PATENTS

| Number | Country | Date |
| --- | --- | --- |
| 551,245 | Great Britain | Feb. 15, 1943 |